United States Patent [19]
Brawley

[11] 3,960,419
[45] June 1, 1976

[54] BEARING COMPONENT

[76] Inventor: Thomas Scott Brawley, 3013 Mayfield Drive, Johnson City, Tenn. 37601

[22] Filed: Mar. 29, 1974

[21] Appl. No.: 456,139

[52] U.S. Cl. ............................... 308/216; 308/214
[51] Int. Cl.² ........................................ F16C 33/58
[58] Field of Search ........ 308/193, 195, 196, 207 R, 308/212, 213, 214, 216; 29/148.4 R

[56] References Cited
UNITED STATES PATENTS

| | | | |
|---|---|---|---|
| 1,338,939 | 5/1920 | Laycock | 308/213 |
| 1,617,319 | 2/1927 | Buckwalter | 308/196 |
| 2,126,912 | 8/1938 | Murden | 29/148.4 R |
| 2,613,429 | 10/1952 | Dierbeck | 29/148.4 R |
| 3,496,619 | 2/1970 | Constant | 29/148.4 R |
| 3,578,831 | 5/1971 | Scheifele | 308/214 |
| 3,689,127 | 9/1972 | Hampp et al. | 308/214 |
| 3,720,450 | 3/1973 | Dominik | 308/214 |

FOREIGN PATENTS OR APPLICATIONS

| | | | |
|---|---|---|---|
| 1,172,567 | 12/1969 | United Kingdom | 308/212 |

Primary Examiner—Albert J. Makay
Assistant Examiner—Randolph A. Reese
Attorney, Agent, or Firm—DeLio and Montgomery

[57] ABSTRACT

An anti-friction bearing component manufactured of constituent parts, such parts being fused into a generally cylindrical body portion having a bearing surface, with flanges or ribs extending radially at each end, at least one such rib being constituted by an annular cap so fused to the body portion that no part of the zone of fusion intrudes into the bearing surface, the other rib being formed by conventional forming processes from end material of the body portion of the bearing component or such other rib being constituted by a second annular cap fused to the body portion in a fashion similar to the first mentioned rib.

5 Claims, 12 Drawing Figures

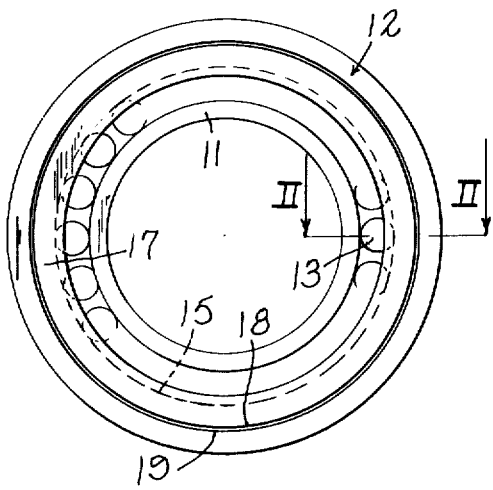
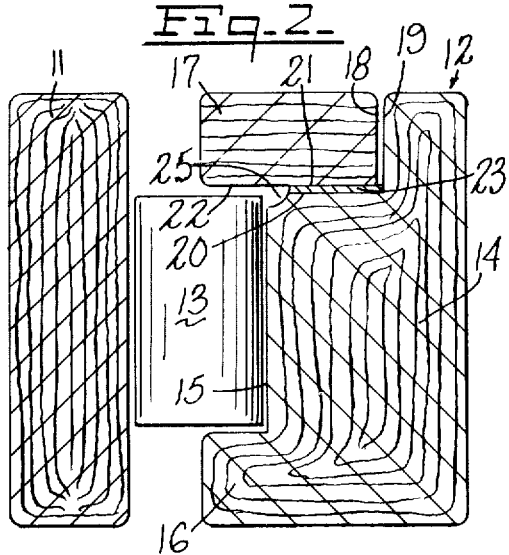
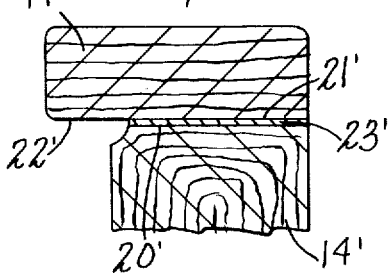
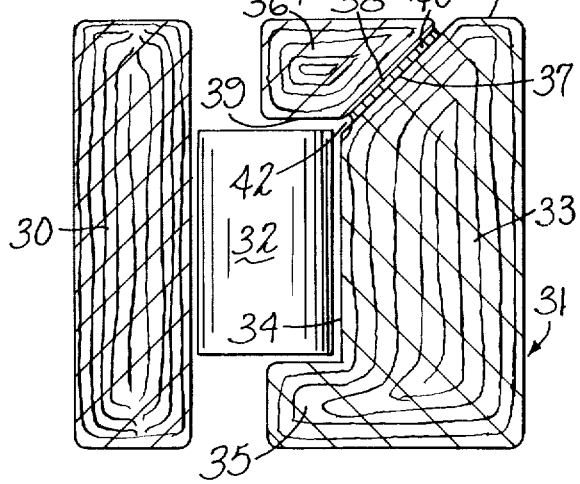
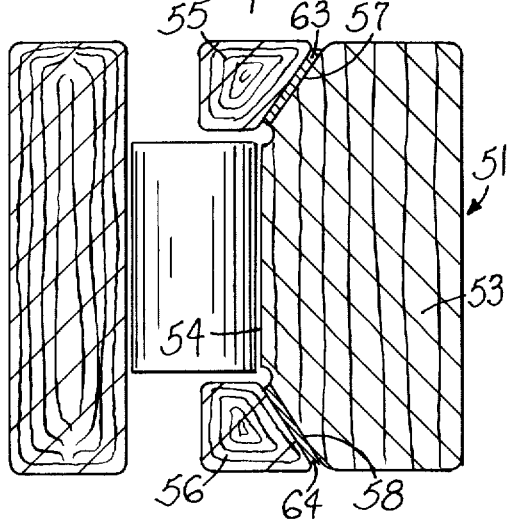
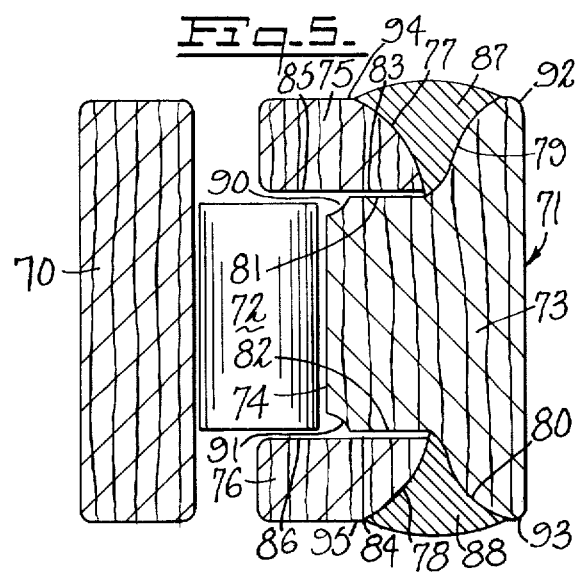

BEARING COMPONENT

This invention relates to anti-friction bearing components, this term being used to include outer and inner anti-friction bearing rings or races for use with rolling bearing elements of cylindrical, needle, conical shapes or other forms. The constituent parts of the bearing components comprise a formed generally cylindrical body portion, which may have a rib formed onto one end in smaller sizes, or the body portion may maintain its generally cylindrical structure in larger sizes, one surface of which, in either instance, being the main bearing surface to be contacted by the rolling elements, at least one end of said body portion being recessed, rabbeted or beveled to receive an annular cap or ring and said cap or ring being fused to the body portion in the recessed, rabbeted or beveled area in such a manner that no material affected by the fusion process intrudes onto the bearing surface, the cap or caps so fused at one or both ends of the body portion creating the rib or ribs normally required to retain and align the axes of the rolling elements in positions perpendicular to the rolling element path.

BACKGROUND OF THE INVENTION

Conventional methods of manufacturing bearing components such as inner and outer rings or races (e.g., from bar or tube stock) have proved to be a relatively slow and costly process. Efforts have been made however to adapt welding techniques to the manufacture of such components. Outstanding examples of these efforts may be found in the U.S. Pat. Nos. to Morrison, 3,229,353 and Cavagnaro, 3,522,644. Another attempt to adapt a welding technique to the manufacture of a related anti-friction bearing component may be found in the U.S. Pat. to Moore, No. 3,748,722. In each of the above patents the weld seam bisects the rolling surface of the bearing component. An absolute requirement of each of these patents is that the weld seam and areas adjacent to the seam must remain permanently bonded and free of cracks. The magnitude of the problem in meeting this requirement is evident where the weldment constitutes part of the bearing surface on the bearing component and/or rolling element. Bearing failure is most commonly associated with defects in the rolling surface within the bearing. The slightest flaw in the metallurgical quality of these surfaces may cause premature bearing failure, and a weld placed in the rolling surface is exposed to stress and fatigue factors which may limit the life of an otherwise well designed, high quality bearing, particularly in heavy duty applications.

Another problem resulting from the presence of a weld seam in the rolling surface is the need for grinding or machining the surface to remove excess welding material and to correct possible macrodeformations. Such grinding or machining must be performed in an efficient manner, to stringent geometry and surface finish specifications. Grinding operations are difficult due to the liability of grinding wheels breaking down in an inconsistent fashion, thus requiring an increased amount of dressing and truing to meet the requirements, all at substantially increased costs. Machining to correct defects involves an additional operation, again with increased costs.

The problems inherent in conventional methods of manufacturing bearing components and in heretofore proposed alternatives can be most effectively overcome according to the present invention by die forming the main body and one end flange or rib, in smaller sizes, or by forging the main body into a generally cylindrical shape in larger sizes, simultaneously forming at least one seat to receive at least one flange or rib, blanking or forming at least one flange or rib to be capped onto each smaller size bearing component or forging at least one flange or rib to be capped onto each larger size bearing component, and welding such flanges or ribs in place by means of a weld spaced from the bearing surface so that the surface requires no machining or a minimum of machining thereof.

Practical embodiments of the invention are shown in the accompanying drawings wherein:

FIG. 1 represents an end view of a roller bearing having its outer race constructed according to the present invention;

FIG. 2 represents a radial section, on the line II—II of FIG. 1, on an enlarged scale with the orientation of the grain indicated;

FIG. 2a represents a detail radial section of a portion of a bearing showing a modification of the structure of FIG. 2, parts being broken away;

FIG. 3 represents a radial section, as in FIG. 2, of a modified form of cylindrical roller bearing with the orientation of grain indicated;

FIG. 4 represents a radial section, as in FIG. 2, of a further modified form of cylindrical roller bearing with the orientation of grain indicated;

FIG. 5 represents a radial section, as in FIG. 2, of a further modified form of cylindrical roller bearing with the orientation of grain, the flanges or ribs being fillet welded;

Figure 6:
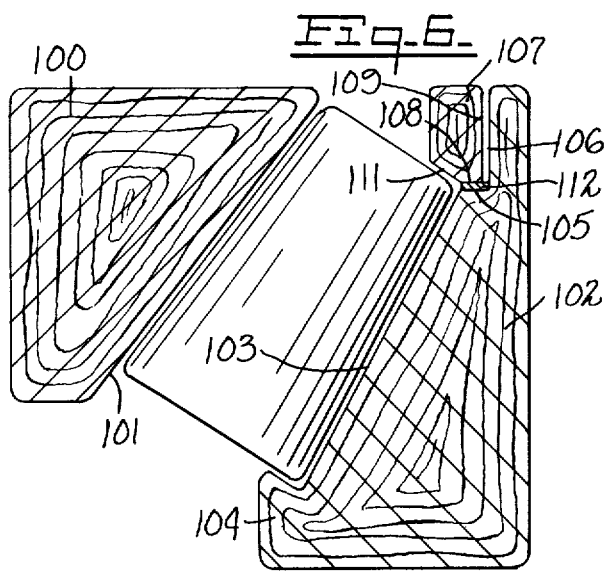
FIG. 6 represents a radial section of a tapered roller bearing with the orientation of grain indicated.

Referring to the drawings, the complete roller bearing (excluding the retainer or cage, not shown) shown in FIG. 1, and sectioned in FIG. 2 comprises an inner ring or race 11, an outer race or ring 12 and a plurality of cylindrical rollers 13. The inner race 11, in this instance, is the plain cylindrical type. The outer race 12 has a body 14, a cylindrical bearing surface 15, bounded on one end by the integral die-formed flange or rib 16 and on the other end by a flange or rib 17 which has been blanked or formed in a separate operation. The end of the outer ring body 14 opposite to the integral die-formed flange or rib 16 is formed with a rabbet around its inner edge, the rabbet having a cylindrical surface 19 which is concentric to the main bearing surface 15 and a flat annular surface 20. The annular cap 17 is bounded by an outer cylindrical surface 18, adapted to fit adjacent the surface 19, and by a flat annular surface 21 which is welded at 23 to the surface 20 and extends radially inward to provide a roller retaining surface 22.

FIG. 2A shows a possible alternative construction wherein the rabbet is eliminated, the main body of the ring being formed with a flat annular surface 20' corresponding to the surface 20, but extended to the outer diameter of the ring body. The annular cap 17' is similarly extended to have its outer diameter aligned with that of the ring body. A truly concentric relation between the outer surfaces would be required in higher quality bearings, and achieving such concentricity may create additional problems in post-fusion processing of the bearing component. The ribs 17 or 17' are constituted by annular caps which are separately blanked or formed in smaller sizes or forged in larger sizes to a size which fits closely in the rabbet or, in the instance where the rabbet has been deleted, the cap is blanked or formed to a size which is equal to the O.D. of the main body 14', and being welded in place by the autogenous weldment 23 or 23' which affects mainly the mating surfaces of the parts as indicated by the shaded areas in FIGS. 2 and 2A. The autogenous weldment may extend to the adjacent mating surfaces 18 and 19, in FIG. 2, or to the O.D. surface of the main body 14' in FIG. 2a, but, in either instance, must not affect to any material degree any part of the bearing surface (15 in FIG. 2). As shown, the cap is so proportioned that it forms a flange or rib 17 symmetrical with the integrally die-formed flange or rib 16. Such symmetry is convenient as making the race ends interchangeable during assembly. The outer race 12 may have one or more lubricant channels 25 designed into one or both ends of the bearing surface 15. The lubricant channel 25 may also serve to decrease the possibility of the presence of minor deformations which might intrude around the areas of the rolling surface of the bearing component, which deformations might result from the fusion welding process.

The cylindrical roller bearing of FIG. 3 is designed and processed in a manner similar to that of FIG. 2. Its design modification offers added strength against axial shock loading and also benefits assembly operations when the cap 36 is positioned against the main body 33 before fusing the constituent parts. The cap 36 will align itself to the main body 33 with a minimum of effort. FIG. 3 comprises an inner race or ring 30, an outer race or ring 31 and a plurality of cylindrical rollers 32. The inner race, in this instance, is the plain cylindrical type. The outer race 31 has a body 33, a cylindrical bearing surface 34, bounded on one end by the integral die-formed flange or rib 35 and on the other end by a flange or rib 36 which has been formed in a separate operation. The end of the outer ring body 33 opposite to the integral die-formed flange or rib 35 is formed with a bevel around its inner edge, replacing the rabbet, and having only one flat surface 37 which is frusto-conic and concentric to the main bearing surface 34. The rabbet, in this instance, has been modified to assure increased strength throughout the weldment. The rib 36 is constituted by an annular cap having a mating interior surface 38 and a cylindrical roller retaining surface 39, the cap being separately formed to a size which fits closely against the beveled seat and being welded in place by the autogenous weldment 40 which affects mainly the mating surfaces 37 and 38 as indicated by the shaded area in FIG. 3. The autogenous weldment 40 may extend to the end portion of the outer race body, surface 43, and to the lubrication channel 42 but must not affect to any material degree any part of the bearing surface 34. As shown, the cap is so proportioned that it forms a flange or rib 36 symmetrical with the integrally formed flange or rib 35. The outer race 33 may have one or more lubricant channels 42 designed into one or both ends of the bearing surface 34.

FIG. 4 shows a type of construction designed for the fabrication of larger sizes of rings wherein die-forming an integral flange is difficult because of the size of the part. The ring 51 is machined with a cylindrical bearing surface 54 extending between surfaces 57 and 58 at each end, caps 55 and 56 being fitted and welded therein by weldments 63 and 64 to form flanges or ribs 55 and 56, each corresponding to the construction shown and described in reference to the flange or rib 36 in FIG. 3. A novel aspect of FIG. 4 is that the raw material saving, regardless of the size of the race 53, amounts to an appreciable increase in the profit margin of the manufactured product. This fact warrants attention, for smaller size rings may also be manufactured utilizing the design concepts of FIG. 4 to decrease the manufacturing costs. It is however to be understood that the design of FIGS. 2 and 3 offers optimum savings as related to the cost of manufacture while the design of FIG. 4 offers a lesser amount of manufacturing cost savings. The design concept of FIG. 4 is especially useful to bearing manufactures who have limited capital investment resources and/or bearing manufacturers who, in a more conservative manner, plan to convert their manufacturing process to that of the present invention. These manufacturers could process the outer race 51 of FIG. 4 from tubing on an automatic screw machine. Productivity would be increased substantially since machining of the rolling surface channel would be eliminated. The caps 55 and 56 would be formed at an absolute minimum cost from bar stock while a welding operation would fuse the constituent parts. An appreciable cost saving would result with a minimum requirement of capital investment outlay.

The cylindrical roller bearing of FIG. 5 has been further modified so that the constituent parts may be fillet welded. This procedure is useful in larger or heavier sizes of bearing components where manufacturing lot quantities are limited or the size of the component surpasses the size limitations of the welding apparatus. The component of FIG. 5 comprises an inner race or ring 70, an outer race or ring 71 and a plurality of cylindrical rollers 72. The inner race 70, in this instance, is the plain cylindrical type. The outer race 71 has a body 73, a cylindrical bearing surface 74, bounded on both ends by rabbets 79 and 80 around their inner edges, the rabbets having flat surfaces 81 and 82 which are concentric at their outermost diameters to the main bearing surface 74. The ribs 75 and 76 are constituted by annular caps having mating interior surfaces 83 and 84, cylindrical roller retaining surfaces 85 and 86 and beveled surfaces 77 and 78, the caps 75 and 76 being separately formed or machined to a size which is slightly smaller than the outermost diameters on surfaces 81 and 82 of the rabbets and being welded in place by fillet welds 87 and 88 which affect mainly the beveled surfaces 77 and 79 on one end of the outer ring 71 and beveled surfaces 78 and 80 on the other end of the outer ring 71 as indicated by the shaded areas in FIG. 5. The fillet welds 87 and 88 are well spaced from rolling surface 74. The welds as shown in FIG. 5 have been undercut to improve the quality of the weld. The weldments 87 and 88 extend beyond the surface level of surfaces 92 and 94 on one end of the outer ring 71 and surfaces 93 and 95 on the other end of the outer ring 71. Such undercut surfaces will later be leveled to a point which is even with surfaces 92 and 94 on one end of the outer ring 71 and surfaces 93 and 95 on the other end of the outer ring 71. This will be done in subsequent end grinding operations which would normally follow the welding process even if the welds were not undercut. The outer race 71 may have two lubricant channels 90 and 91 designed into both ends of the bearing surface 74. Although the grain orientation of FIG. 5 is similar to the orientation of grain in conventional bearings, manufacturing costs are decreased due to the saving of raw material.

Tapered roller bearings are characterized by the fact that the apexes of the tapered working surfaces of both rollers and races, if extended, would coincide on the bearing axis. Tapered rollers, as shown in FIG. 6, are held in accurate alignment by means of guide flanges 104 and 107 on the inner ring 102 and the outer ring 100 normally has no flange. In the tapered bearing of FIG. 6 the outer ring 100 has a tapered bearing surface 101 but no flange or rib, while the inner ring 102 has a tapered bearing surface 103, bounded at its larger diameter end by the integrally die-formed guide flange 104. At the smaller diameter end ring 102 is rabbeted to form a flat annular surface 105 and a cylindrical surface 106, a rib 107 being constituted by an annular cap having mating interior surface 108, a roller retaining surface 111 and a cylindrical outer surface 109, the cap being separately formed to a size which will fit closely to the rabbet and being diffusion welded or resistance butt welded by autogenous weldment 112 which affects mainly the surfaces 105 and 108 as indicated by the shaded area in FIG. 6. As in the case of weldment 23, the weldment 112 may extend to the adjacent mating surfaces 106 and 109 but must not affect to any material degree any part of the bearing surface 103. Tapered roller bearing components may, alternatively, be made to include the features of design and methods of manufacture as illustrated in FIGS. 2, 2a, 3, 4 and 5.

Figure 7:
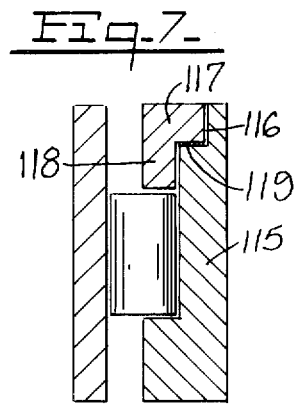
FIGS. 7 and 8 represent, somewhat diagrammatically, radial sectional views of detail variations on the components shown in FIGS. 2 and 3, respectively.
Figure 8:
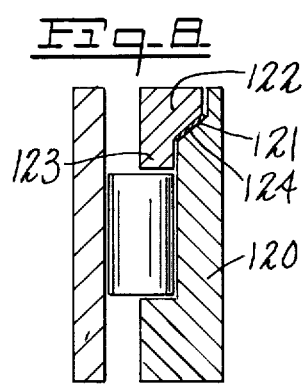

In FIG. 7 there is shown a detail modification wherein the formed or forged ring 115 is somewhat elongated and provided with a recess in the form of a 90° rabbet 116, the rib 117 (corresponding to rib 17 in FIG. 2) including an axial extension 118, whereby a weldment at 119 is spaced a substantial distance from the bearing surface. According to FIG. 8 the formed or forged ring 120 has a recess bounded in part by a beveled surface 121 (corresponding to surface 37 in FIG. 3) and the rib 122 is beveled complementarily and provided with an extension 123, which ensures a substantial spacing of the weld 124 (at the beveled surfaces) from the bearing surface.

The complementary surfaces of the ring body and cap are shown as having cross-sectional forms corresponding to a 90° rabbet (FIGS. 2 and 6), annular planes (FIG. 2a) and beveled or frusto-conic surfaces (FIGS. 3 and 4) as well as the fillet weld arrangement of FIG. 5. Further possible modifications of the cross-sectional form include rounding of the rabbet to make it concave or convex or disposing its walls at angles other than right angles, or providing a stepped profile, such that the ring can, preferably, be hot or cold formed, or forged, to the selected outline and the cap (to form a flange) can also be formed to present a complementary surface, without machining of either part. Unless otherwise indicated the expression "recess" is intended herein to include all of the profiles identified above.

It will be understood that inner or outer races or rings for use with needle or other rolling elements may be made as disclosed herein.

Figure 9:
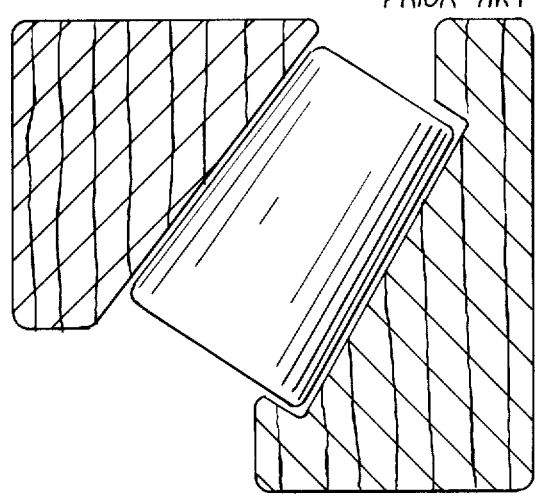
FIG. 9 represents a radial section of a tapered roller bearing with the orientation of grain indicated, both inner and outer rings having been processed by conventional methods using bar and/or tube stock.
Figure 10:
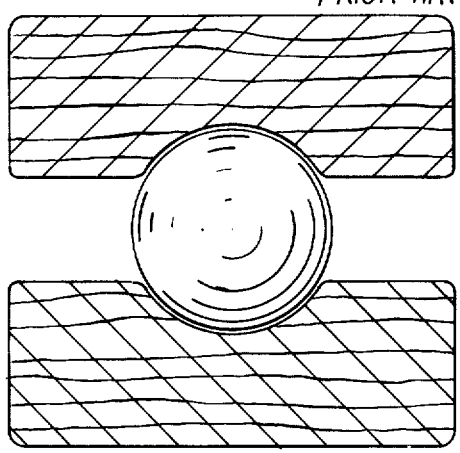
FIG. 10 represents a radial section of a ball bearing with the orientation of grain indicated, both inner and outer rings having been processed by conventional methods using bar and/or tube stock.
Figure 11:
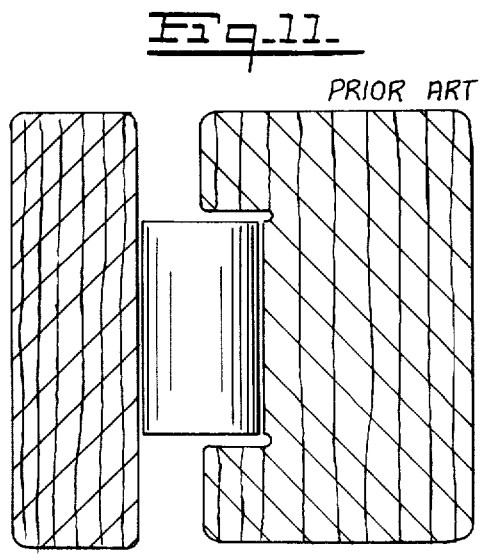
FIG. 11 represents a radial section of a cylindrical roller bearing with the orientation of grain indicated, both inner and outer rings having been processed by conventional methods using bar and/or tube stock.

It has been customary for bearing manufacturers to make the smaller inner and outer rings on automatic screw machines using either bar stock or tubing. The direction of the grain flow in each of these instances is the same. The grain flow is lengthwise on the tubing or bar stock, which is perpendicular to the direction of rolling element travel in the assembled bearing. FIGS. 9, 10 and 11 illustrate this fact. The rolling elements travel against the grain giving increased fatigue resistance. The screw machine, however, hogs out the stock of the raceway channel and the grain flow becomes interrupted or segmented so that end grain fiber becomes exposed on either side of the raceway channel (see FIGS. 9, 10 and 11). The end grain portions of the raceway will have a tendency to fail prematurely when bearing loads place direct pressure upon the end fiber. This is due to the fact that the end grain portion of the fiber is the weakest part of the grain structure. Should asperities be present on the rolling element surface which mates with the channeled rolling surface, such asperities would serve to split the end fiber of the rolling surface under moderate to heavy bearing loads. Also, if impurities should intrude within the working bearing such impurities or particles thereof would more easily become lodged between the fiber of the end grain under moderate to heavy bearing loads. The impurities would then serve as a wedge to split the grain along the direction of the end fiber. As a result of either of these occurrences a pitting effect would become apparent. This fact becomes more noticeable in ball and tapered bearings where the end grain fiber is exposed to high stress areas of the rolling surface.

It will be understood that the present invention acquires much of its importance from substantial reductions in raw material waste. Die-forming operations such as cold forming, hot forming and forging processes become especially useful in reducing waste material. Such operations may also increase productivity, reduce the cost of raw material and may bring about an extended bearing life to the assembled working bearing. In such operations the main body is formed or forged while the caps are blanked from sheet stock, formed from wire or bar stock or forged from bar stock or other raw material.

In a cold former or header machine, wire or bar stock is fed into the machine. The raw material is sheared off and placed between two dies. One of the dies closes against the other die to form the part. As the dies open the material is transferred to another position where another forming operation is performed by another set of dies, this progression being continued until a ring has been formed. Currently, rings may be processed up to 3 inches O.D. with such progressive forming processes.

Another method of forming rings is the forging method. Bar stock or other raw material may be used. When bar stock is used the material is cut in one operation. In a second operation the material is heated to forging temperatures and placed into a forging press. The forging press knocks out the center of the bar segments to form a ring. The center or knockout portion of the bar may be re-used to form other rings. Rings with O.D. dimensions larger than 3 inches may be processed with this method.

The manufacture of bearing components as described herein offers a full spectrum of roller bearing design up to and including heavy duty applications for radial and axial loading. The methods of manufacture also offer a full spectrum of processing, the results of which offer various degrees of waste material savings, raw material cost savings and increased productivity. In many instances machining operations may be eliminated or substantially so. Material cost may be substantially reduced by forming wire, bar stock or other raw material, as compared to processing tubing on an automatic screw machine. The necessity of placing many different sizes of tubing in the inventory may be substantially reduced since wire or bar stock may be drawn to various sizes before forming operations occur. Ordering quantities will therefore become larger to reduce steel cost to an absolute minimum. The cost of tooling is reduced by minimizing machining, and problems of conveying waste material to disposal areas are substantially eliminated.

Furthermore, the quality of the product is greatly improved, particularly in the bearing surface of the channeled ring. This is because the best quality material is found on the surface of the raw material. A greater proportion of this superior quality material remains with the bearing component throughout the manufacturing process. The metallurgical quality of the raceway surface will therefore remain largely undisturbed, in the absence of the usual machining. Grain flow is also superior to that of a machined ring since, according to the present invention, the rolling elements roll against the grain and no end grain fiber is exposed to the rolling element channel. In this manner a highly desirable grain flow is designed into the processing of the rolling surface.

Fusing the caps onto the bearing bodies to form the flanges or ribs may be effected in a variety of conventional manners. Resistance welding using preheating and/or post-heating techniques may be applied. Diffusion welding in a vacuum furnace is another method. Each of these methods is particularly economical since no consumable electrode welding materials are needed and the completed bearing component requires a minimum of finishing to be ready for use. In each of these instances pressure may be applied to the surfaces to be welded. Other welding techniques may be used, however the application of the fusion process is governed largely by the intended application of the working bearing and the raw material composition of the bearing component. Other fusion processes may also be applied to lower quality bearings. Such processes as brazing, chemical bonding or chemical adhering techniques are also within the scope of the present invention. In every instance however the area of fusion is effected at a seam apart from the bearing surfaces.

It will thus be seen that the objects set forth above, among those made apparent from the preceding description, are efficiently attained and, since certain changes may be made in the described product, and in the construction set forth without departing from the spirit and scope of the invention, it is intended that all matter contained in the above description and shown in the accompanying drawings shall be interpreted as illustrative and not in a limiting sense.

What I claim is:

1. A channeled anti-friction bearing component comprising a generally cylindrical body portion, a frusto-conic bearing surface on said body portion constituting the bottom of a channel, a separately constructed annular rib having a surface defining the smaller end of said channel, the body portion being formed with an annular recess adjacent said smaller end and the annular rib being fitted in said recess and fused to said body by a weldment spaced from the end of said bearing surface, and an integrally formed rib having a surface defining the larger end of the channel, the metal flow in said body and said integrally formed rib running in directions which lie substantially parallel to the corresponding sides of the axial cross-section of the channel and being substantially uninterrupted.

2. An anti-friction bearing component according to claim 1 wherein the separately constructed annular rib has at least one surface complementary to at least a portion of the surface of said annular recess, said surfaces extending to the adjacent end of the bearing component and being united by the weldment.

3. An anti-friction bearing component according to claim 1 wherein the metal flow in said body and said separately constructed rib runs in directions which lie substantially parallel to the corresponding sides of the axial cross-section of the channel.

4. A channeled anti-friction bearing component comprising a generally cylindrical body portion, a frusto-conic bearing surface on said body portion constituting the bottom of a channel, a separately constructed annular rib having a surface defining the smaller end of said channel, and an integrally formed rib having a surface defining the larger end of the channel, the metal flow in said body and said integrally formed rib running in directions which lie substantially parallel to the corresponding sides of the axial cross-section of the channel.

5. An anti-friction bearing component according to claim 4 wherein the metal flow is substantially uninterrupted.

* * * * *